United States Patent Office 3,198,768
Patented Aug. 3, 1965

3,198,768
PROCESS FOR THE POLYMERIZATION OF ALDEHYDES
Shinichi Ishida, Itabashi-ku, Tokyo, Japan, assignor to Asahi Kasei Kogyo Kabushiki Kaisha, Osaka, Japan, a corporation of Japan
No Drawing. Filed Apr. 18, 1961, Ser. No. 103,712
Claims priority, application Japan, Apr. 26, 1960, 35/22,103; Nov. 2, 1960, 35/44,091; Nov. 10, 1960, 35/44,352, 35/44,353
5 Claims. (Cl. 260—67)

This invention relates to the novel polymerization process for aldehydes and particularly for aliphatic aldehydes.

M. Letort and M. W. Travers et al. reported the polymerization of acetaldehyde and some higher aldehydes, and recently J. Furukawa found that such aldehydes can be polymerized on alumina by vacuum charging.

This polymerization is a polyaddition reaction resulting from the clevage of aldehyde groups and the product thereby obtained usually has polyether structure. This product in general may be considered stereostructurally as including three isomers with different structures. However, polyaldehydes which are known up to the present are found to be amorphous material which have an irregular structure and are considered one type of the above-mentioned isomeric structures. These polyaldehydes because of their being soft and waxy are not suitable for use as forming material.

It is accordingly one object of the present invention to provide the production of regularly structured, crystalline polyether with commercial advantages. Said polyether is entirely different from the known polymer but is considered as another type of the three isomers as referred to previously.

Other objects, features, capabilities and advantages which are comprehended by the invention will be apparent from the description and claims which follow.

Amorphous polyacetaldehyde which has been heretofore known is a rubber-like elastomer being so thermally unstable that gradual depolymerization may occur even in the air. Thus it fails to resist attacks during the subsequent treatment or processing and it is very far from suitable forming materials which can be practicably used. The polymeric product of the present invention, however, is a non-tacky, normally solid plastic material having higher crystallinity and also having superior durability as well as heat stability vis-a-vis to those of the prior amorphous polyaldehyde. Thus this product can be employed as forming material for the manufacture of shaped articles such as film, fiber, pipe, rod and the like.

One feature of the present invention resides in a process for producing polyaldehyde having partially crystalline polyether structure, which comprises polymerizing alkyl, alkenyl, cycloalkyl, aikylaryl, halogenated alkyl or heterocyclic aldehyde with two to ten carbon atoms at a low temperature of —30° C. to —120° C. in the presence of a solvent by using a joint catalyst comprising an organo-metallic compound of group II in the periodic table and a solid acid wholly or mainly containing alumina.

The joint catalyst of the present invention may be prepared by containing an organometallic compound of group II in the periodic table and a solid acid wholly or mainly containing at a room temperature or higher. A process of the invention may be carried out more effectively by adding an aldehyde to the joint catalyst at a room temperature or a higher temperature which does not initiate the polymerization of said aldehyde and then removing the temperature of the mixture to the polymerization temperature. One way to carry out the invention in practice is to prepare the suspension of polymerized product by the use of an inert solvent which is a non-solvent for the produced polyaldehyde. An alternative way is to obtain the homogeneous solution of polymerized product by the use of a solvent for the produced polyaldehyde.

Among aldehydes which may be polymerizable by the process of the invention are aliphatic aldehydes represented by the general formula RCHO where R is alkyl, cycloalkyl, alkenyl or cycloalkenyl radical, or the halogen-substituted derivatives or five- or six-membered oxygen containing heterocyclic radicals. Preferably as aldehydes there are used saturated aliphatic aldehydes having two to ten carbon atoms and particularly two to seven carbon atoms. Typical aldehydes usable herein are acetaldehyde, propionaldehyde, n-butylaldehyde, isobutyraldehyde, valeraldehyde, isovaleraldehyde, hexanal, 2-ethyl hexanal, heptanal, octanal, nonal, decanal, monochloracetaldehyde, dichloracetaldehyde, trichloracetaldehyde, monofluoracetaldehyde, difluoracetaldehyde, trifluoracetaldehyde, monochlorpropionaldehydes, $\alpha,\beta$-dichlorpropionaldehydes, $\alpha,\alpha$; $\beta,\beta$; $\alpha,\beta$-trichloropropionaldehydes, cyclohexylaldehyde, cyclohexyl acetaldehyde, furfural, 3-cyclohexenecarboxyaldehyde, 2 - formyl-3,4-dihydro 2H-pyran, etc. These aldehydes can be used singly or in combination.

A catalyst which may be used herein comprises an organometallic compound of a metal of group II in the periodic table and aluminum oxide mainly comprising so called $\gamma$-alumina. In the polymerization system, both of these catalyst components or a certain interaction product between these components should be present.

The first component of a catalyst, that is, an organometallic compound of a metal of Group II in the periodic table, can be expressed by the general formula $MR'_2$ or $MR'X$ where R' is hydrogen atom, or alkyl, alkenyl, cycloalkyl, aryl, arylalkyl, alkoxy or aryloxy radical or the halogen-substituted radical thereof and X is hydrogen, halogen, alkoxy or hydroxyl radical, and M means beryllium, magnesium, calcium, strontium, zinc, cadmium or mercury. Particularly suitable as such component are metal alkyls, metal aryls and metal cycloalkyls, including diethyl beryllium, diethyl zinc, dibutyl zinc, diphenyl zinc, diethyl magnesium, diphenyl magnesium, tetraethyl zinc calcium, diethyl calcium, diphenyl mercury, diethyl cadmium, diphenyl cadmium, dicyclohexyl magnesium, dicyclohexyl zinc, etc.

In order for the preparation of alumina used herein, there are known various ways. One way includes hydrolyzing aluminum alkoxide in alcohol and calcinating the hydrolysis product to form alumina. Another way is calcinating aluminum salt, e.g. aluminum nitrate, aluminum acetate, aluminum sulfate, etc., directly, or hydrolyzing the aluminum salt with ammonium hydroxide and then, after washing, calcinating the hydrolysis product. Still another way is calcinating commercially available alumina for catalyst. It is essential to avoid the exposure of the prepared alumina to water and air. Firing temperature may range from 400° C.–1200° C. Suitably it is 500° C.–1000° C. and more particularly 600° C.–900° C. The firing serves to remove gas or moisture liberated thereby, and accordingly it is necessary to effect the contact of the thus prepared alumina with the specified organometallic compound in such a way that air, gas or moisture is not fixed again.

In addition to substantially pure alumina, there can be used such metal oxide mixture as mainly containing alumina but also containing other metal oxide capable of forming solid acid, e.g. one or more than oxides of beryllium, magnesium, titanium, zirconium, vanadium, chromium, molybdenum, tungsten, manganese, iron, cobalt, nickel, palladium, platinum, zinc, cadmium, gallium, indium, silicon, germanium, tin, lutenium, selenium, tellurium and the like. These specified metal oxides may be prepared by a usual way, but it is rather preferable or sometimes necessary to use the metal oxides having been fired.

With respect to orgnaometallic compounds, the catalyst amount required for a process of the invention may vary depending on the type and amount of alumina, but usually ranges from about 0.01–10% by mole, based on the amount of aldehyde, and particularly from about 0.1 to 3% by mole. The amount of alumina component may be within the range of from 1 to 30% by weight based on the weight of aldehyde and particularly within the range of from 5 to 20% by weight. The weight ratio of organometallic compound to alumina is 1/100–50/100 and the former may be usually in amount of 5% to 20% based on the weight of the latter.

In the prefered example, accordingly, 5–20% of alumina based on the weight of aldehyde to be polymerized, and 5–20% of organometallic compound, based on the weight of the alumina are used. The proportion of said organometallic compound to said aldehyde being within the range of from 0.03% to 10% by weight.

Where the organometallic compound is too little, another type of a low molecular reaction, because of the acidity of the solid catalyst concerned, simultaneously occurs resulting in the failure to obtain the preferable polymer material. Where the organometallic compound it too large, polymerization occurs due to the presence of free organometallic compounds not combined with solid catalyst.

In general, the amount of a catalyst to be used here is somewhat dependent upon the purity of monomer and solvent or diluent to be used. If the purity of these materials is lower, the degradation of a catalyst composition frequently results from the action of the reactive impurities contained and the relatively increased amount of said catalyst is required. In order to secure the decreased loss of said catalyst and the preparation of a polymer of excellent quality, the pressure of carbonic acid gas, oxygen, moisture or alcohol should be avoided as possible.

This invention can be carried out in effect even in the absence of solvents or diluents, but it will be more preferably carried out by using these solvents or diluents.

Solvents which may be used herein include any material other than those which damage the activity of a catalyst. Particularly suitable are liquid organic compounds being liquid at a temperature within the polymerization temperature range (−30° C. to −120° C.) or a mixture thereof. Typical solvents are alkanes, e.g. propane, butane, pentane, hexane, heptane, octane; cycloalkanes, e.g. cyclobutane, cyclohexane, methylcyclohexane, tetralin, decalin, etc.; alkanes, such as propylene, butene; aryls, such as benzene, toluene, xylenes, etc.; and others such as dialkyl ethers, diaryl ethers, cycloalkyl ethers, cyclic ethers and the mixed ethers of these, including diethyl ether, dipropyl ether, ethylene glycol dimethyl ethers, dioxane, anisol, etc. Solvents which are most characteristic are halogenated hydrocarbons, halogenated ethers, e.g. methyl chloride, methylene chloride, chloroform, carbon tetrachloride, ethylene chlorides, monochlorethylene, dichlorethylene, trichlorethylene, and esters, e.g. ethyl acetate, ethyl butyrate, diethyl carbonate, etc., and nitriles such as acetonitrile, propionitrile or the like, singly or in combinatioin.

The polymerization of the present invention can be carried out at a low temperature, for example, from less than 0° C. up to a temperature at which aldehyde to be polymerized is solidified, and preferrably from −20° C. to −120° C. From the economical viewpoint, a temperature of from −20° C. to −80° C. is prefered.

With great interest it has been known that the reaction rate of the present polymerization has a negative coefficient of temperature and that if the temperature is lowered, the polymerization rate is increased and also the crystalline portion of the raw polymer is developed.

The polymerization temperature is critical. The upper limit may vary depending on the type of catalyst, solvent and aldehyde. In the case where acetaldehyde is polymerized, the upper limit for polymerization is about −40° C. Therefore, the polymerization should be carried out as low as possible. While the polymerization reaction is usually carried out under spontaneous pressure, sometimes high pressure of an inert gas as high as several hundred kg./cm.$^2$ can be used if necessary.

Now detailed explanation will be given for the present invention.

As stated above, when acetaldehyde is polymerized in the presence of alumina alone, only amorphous polymer can be obtained. According to the instant process of the invention the use of a joint catalyst containing alumina and organometallic compound provides a polymer containing crystalline part. The polymerization on alumina in the former case was effected by slow vacuum charging without use of solvents. The present process, however, permits the addition of a large amount of aldehyde at one time in a suitable solvent, whereby a substantially crystalline polymer having a majority of crystalline part is produced at increased polymerization velocity.

The joint catalyst which is one feature of the invention can be prepared by contacting solid acid mainly comprising alumina with organometallic compound. This procedure may take place in the presence or absence of a solvent and under reduced pressure if necessary. Although the contact between alumina and organometallic compound may be carried out in the presence of the aldehyde, it is desirable that such contact is effected prior to the polymerization. It is desirable to effect the contact between alumina and organometallic compound at a temperature above room temperature up to about 100° C., but, of course, it is possible to effect the contact at a lower temperature.

After the formation of the joint catalyst, aldehyde to be polymerized is added at substantially room temperature with advantage. For the formation of a truly effective initiator by the reaction of the aldehyde with the joint catalyst, the addition at a higher temperature is preferable to the addition at a lower temperature such as is suitable for the polymerization. In respect to the above, it has been found that the preparation of the joint catalyst as well as the addition of the catalyst to the aldehyde or the introduction of the catalyst over the catalyst is not necessarily effected at a low temperature below the polymerization temperature. These procedures can be effected at room temperature or a temperature lower than room temperature but which is higher than the polymerization-initiating point. Accordingly, after uniformly mixing aldehyde, catalyst and solvent at the specified temperature and sometimes heating or permitting mixture to ripen truly effective initiator, the mixture is cooled down to the polymerization temperature, thereby the polymerization of aldehyde is effected and simultaneously the effect of the solvent used in strengthened. For technical purposes, the mixing prior to the polymerization can be effected at about room temperature (from −5° C. to +30° C.). Furthermore the preservation of the polymerization mixture is possible and the weighing analysis is easy. In addition to these advantages, the possibilities for preservation, transfer or continuous polymerization as stock solution are provided. The crystallinity of produced polyaldehyde remarkedly varies depending on the method of polymerization employed. In general, as disclosed, my pending Japanese patent application No. 22,104/1960, the use of hydrocarbons as solvents increases crystallinity of the product, and this feature is further developed by the addition of the catalyst at the room temperature. For example, since amorphous polyacetaldehyde is methanol-soluble, the methanol-soluble fraction (percent) in raw polymer may be considered as a measure of crystallinity. When carrying out polymerization at −78° C. without solvents by the addition of the catalyst at −78° C., the methanol-soluble fraction is about 50%. When adding the catalyst at −78° C. in the presence of n-hexane solvent and carrying out the polymerization at −78° C., the methanol-soluble fraction is about 30%. Where adding the catalyst at ordinary temperature into n-hexane and carrying out the polymerization at −78° C., the methanol-soluble fraction is about 10%, and the value of polymerization yield per unit time is also increased several times for a short time. Thus a process of the present invention can provide the production of crystalline polyaldyde in good yield with assuring several advantages for operations and the improvement in quality.

Halogenated hydrocarbons including methylene dichloride are such solvent as constitute one characteristic aspect of the present invention. Acetaldehyde is miscible at any proportion in methylene chloride at a low temperature. When carrying out the polymerization in this solution by using the joint catalyst, the homogeneous solution of the polymer is obtained, and the filtrate of the solution is evaporated to directly form a film or it is extruded into a non-solvent for polymer, e.g. n-hexane, to produce filament. The thus obtained polyaldehyde also is crystalline and stable. The crystallinity may vary more or less depending on the polymerization conditions. Sometimes the obtained polymer is in the form of stereoblock polymer. While the preparation of film or shaped article from a solution of polyaldehyde obtained by the use as solvent of alkyl hydrocarbon, e.g. n-hexane is rather difficult, that of film, filament or the like from a solution of polyaldehyde obtained by the use of halogenated hydrocarbon is very easy. Unless the polymer is extremely highly polymeric, halogenated alkanes have solubilizing capacity for crystalline polyacetaldehyde. Accordingly, since crystalline polymer can be obtained in the form of a homogeneous solution, the continuous solution polymerization is possible, which eliminates separation, drying, powdering or sometimes dissolving steps necessary for batch process.

Further solid catalysts used herein can be readily separated by simple procedures, e.g., filtration, centrifugal separation etc. This ready separation facilitates the production of a polymer having excellent quality, because the remaining catalyst in produced polymer adversely affects upon the stability of the polymer. In case when other solvent than halogenated hydrocarbon is used, the separation of produced polymer usually solid is considerably troublesome.

The solvents capable of producing a homogeneous polymer solution are chloroform, methylene chloride, carbon tetrachloride, monochlorobenzene and dichlorbenzene singly or in combination. Also toluene, xylene, dichlorethyl ether and the like are suitable.

In the same way as stated above, where carrying out the polymerization by the use of more than two aldehydes, a copolymeric material is obtained. This is very effective for the modification of various physical properties. The use of halogenated aliphatic aldehydes can impart characteristic properties. Also a block copolymer can be produced.

Now the following examples will be given for detailed explanation of the invention. But these examples should not be construed as limiting the scope of the invention.

Example 1

Into a vessel in which the air has been substituted with nitrogen, 1 g. of granular alumina (prepared by treating the market product with heat at 600° C. in vacuo for 3 hours) and 20 ml. of anhydrous diethyl ether are charged, and 1 ml. of a 30% solution of zinc diethyl in diethyl ether is added thereto, with stirring. Then 10 ml. of acetaldehyde is added thereto and the mixture is cooled at −78° C. After 2 hours, jelly material formed begins to float up and gradually increases in amount. After 6 hours, the product is added with ether to separate alumina and then dried in vacuo. About 20% of white solid product can be extracted with methanol. The extraction residue is crystalline, as is shown by X-ray analysis. It is polyacetaldehyde of polyether type as is shown by its infrared spectra.

Example 2

Aluminum isopropoxide just after distillation is added with water, gradually heated and fired in an electric furnace at 800° C. for 3 hours. The thus resulted alumina, 5 g., is charged into a vessel, in which the air has been substituted with nitrogen. At room temperature, 0.5 g. of diethyl zinc is added, with stirring. After remaining the mixture for 30 minutes, degasification is effected under reduced pressure, and 30 cc. of dry n-hexane and then acetaldehyde are added thereto, and the resultant mixture is allowed to stand in a bath at −78° C. for 3 hours. After reaction, n-hexane, 30 cc., is added and the product is separated from alumina, washed and vacuum dried thereby resulting 4.7 parts of polyacetaldehyde containing crystalline part.

Example 3

Into a vessel, in which the air has been substituted with nitrogen, 5 g. of alumina, prepared by the same way as in Example 2, and 0.5 g. of dithyl zinc are added at room temperature. Produced gas is removed under reduced pressure, and 10 g. of acetaldehyde and then 30 g. of diethyl ether are added. After tightly sealing, the mixture is remained in a bath at −78° C. for 3 hours to effect polymerization. Then the content is vented, and added with 20 cc. n-hexane. The product is separated from alumina, washed and vacuum dried thereby resulting 3.9 g. of polyacetaldehyde containing crystalline part.

Example 4

Into a vessel, in which the air has been substituted with nitrogen, 5 g. of silica-alumina ($SiO_2$ 85%, $Al_2O_3$ 15%) for marketed catalyst use is placed and then 0.5 g. of diethyl zinc and 15 ml. of diethyl ether are added and further 10 g. of acetaldehyde is added. After tightly sealing, the total charge is cooled at −78° C. for ten hours and worked up in the same manner as in Example 1, thereby resulting 2.7 parts of polyacetaldehyde containing crystalline parts.

Example 5

One gram of alumina, used in Example 1, is treated at 450° C. in vacuo and added with 0.3 g. of zinc diethyl and 10 ml. of n-hexane in vacuo. After effecting degasification, all of liquid components are distilled out under high vacuo. The air is substituted with sufficiently purified dried nitrogen, and 10 g. of acetaldehyde and 20 ml. of n-hexane are added. After sealing, the mixture is allowed to stand in a bath at −78° C. for 3 hours during which polymerization is effected. After venting, 50 ml. of n-hexane is added and trituration is effected. The product is separated from alumina, washed, and vacuum dried thereby resulting 3.2 g. of white solid polymer.

Example 6

To one gram of alumina, prepared in the same manner as in Example 5, 0.5 g. of zinc diethyl and 10 ml. of methylene chloride are added, and degasification from the mixture is sufficiently effected. The air is substituted with well purified nitrogen, and the content is added with 10 g. of acetaldehyde and 20 ml. of methylene chloride at room temperature. After sealing, the total mixture is allowed to stand in a bath at −78° C. for 3 hours during which polymerization is effected. The reaction mixture becomes uniform transparent viscous liquid. After venting, the reaction product is filtered and poured into n-hexane under nitrogen atmosphere. A part is drawn onto a glass plate and the solvent is evaporated, thereby obtaining a self supporting film. The product can be also obtained in the shape of filamentary mass or flake. This is washed and vacuum dried thereby giving 8.2 g. of white solid crystalline polymer.

What is claimed is:

1. A process for producing crystalline polyether type polyacetaldehyde which comprises polymerizing acetaldehyde monomer in the presence of a catalyst consisting of a composition of zinc di-lower alkyl together with a member of the group consisting of alumina and silica-alumina, said polymerization being conducted in an inert liquid medium and at a temperature between −40° C. to −120° C.

2. A process according to claim 1, wherein the catalyst is prepared by treating a member of the group consisting of alumina and silica-alumina with zinc di-lower alkyl.

3. A process according to claim 1, wherein monomeric acetaldehyde is first admixed with the catalyst at a temperature between −40° C. and +30° C. and thereafter the temperature is lowered to a polymerization temperature between −40° C. and −120° C.

4. A process according to claim 1, wherein the amount of zinc di-lower alkyl is within the range from 0.01 mol percent to 10 mol percent based on the amount of the acetaldehyde monomer, and within the range from 1 weight percent to 50 weight percent based on the weight of the member of the group consisting of alumina and silica-alumina, and wherein the amount of the member of the group consisting of alumina and silica-alumina is within the range from 1 weight percent to 30 weight percent based on the weight of of the acetaldehyde monomer.

5. A process according to claim 1, wherein the inner solvent medium is a member selected from the group consisting of aliphatic hydrocarbons, cycloaliphatic hydrocarbons, aromatic hydrocarbons, halogen-substituted hydrocarbons, ethers and nitriles, said solvent medium being liquid at the polymerization temperature.

References Cited by the Examiner

Furukawa et al.: Makro Chemie, vol. 33, pp. 32–40.
Chem. Abstracts, vol. 46, pp. 1520, 6586, 6587.
Furukawa et al.: Journ. of Polymer Sci., vol. XXXVI, Issue No. 130 (1959), p. 546.
Derwent Belgian Patents Report, vol. 59A (November 1959), p. A17–188, For. Pat. Jrl.
Natta et al.: Die Makromolekulare Chemie, vol. XXXVII (April 1960), pp. 156–159.
Furukawa et al.: Die Makromolekulare Chemie, vol. XXXVII (April 1960), pp. 149–152.
Fujii et al.: Die Makromolekulare Chemie, vol. XL (October 1960), pp. 226–228 (p. 226 relied on).

WILLIAM H. SHORT, *Primary Examiner.*

MILTON STERMAN, LOUISE P. QUAST, *Examiners.*